United States Patent [19]
Robinson et al.

[11] 3,799,620
[45] Mar. 26, 1974

[54] APPARATUS FOR TRANSPORTING AND HANDLING BULK MATERIAL

[75] Inventors: Charles W. Robinson, San Francisco; Wilbert N. Sims, Alamo; William R. Archibald, San Anselmo, all of Calif.

[73] Assignee: Marcona Corporation, San Francisco, Calif.

[22] Filed: Sept. 5, 1972

[21] Appl. No.: 286,102

[52] U.S. Cl............ 302/15, 134/43, 134/123, 134/167 R, 214/44 R
[51] Int. Cl............................................ B65g 53/30
[58] Field of Search............ 134/43, 45, 56 R, 57 R, 134/123, 167 R, 168 R; 214/44 R; 302/14–16

[56] References Cited
UNITED STATES PATENTS

| | | | |
|---|---|---|---|
| 1,951,649 | 3/1934 | Delano | 134/167 R |
| 2,240,227 | 4/1941 | Saussure | 134/168 R |
| 3,606,479 | 9/1971 | Robinson et al. | 302/16 |
| 3,650,420 | 3/1972 | Mahaney | 214/44 R |
| 3,411,462 | 11/1968 | Mathison | 214/44 R UX |
| 3,322,454 | 5/1967 | Mindrum | 294/64 R |
| 2,979,152 | 4/1961 | Eitel | 212/39 P UX |
| 2,306,926 | 12/1942 | Allen | 134/167 R X |
| 1,693,885 | 12/1928 | Butterworth | 134/168 R |
| 1,507,151 | 9/1924 | Bennett et al. | 134/168 R X |

FOREIGN PATENTS OR APPLICATIONS

| | | | |
|---|---|---|---|
| 718,292 | 11/1954 | Great Britain | 134/168 R |

*Primary Examiner*—Evon C. Blunk
*Assistant Examiner*—W. Scott Carson

[57] ABSTRACT

Apparatus for transporting and handling bulk material such as a settled mass of particulate matter characterized by being dispersible with a liquid into a pumpable mixture or slurry. The apparatus includes railroad tank cars carrying vessels adapted to contain the settled mass for movement as a train along a railroad right of way. At an unloading zone an unloading and slurrifying unit is provided which includes a nozzle and slurry receiving sump adapted for movement along the right of way for accurate positioning with respect to an overlying vehicle. Elevating means is provided to move the nozzle upwardly through an opened discharge outlet provided in a flat bottom of the vessel. The sump is carried upwardly with the nozzle for yieldable contact with a flat sealing plate around the discharge outlet. A hollow, fluid containing annulus carried at the upper end of the sump both forms a seal with the vessel sealing plate and senses contact therewith for actuating means to direct a high pressure stream of liquid to the nozzle. The nozzle is moved upwardly into the vessel with the liquid stream impinging upon and slurrifying the particulate matter as the nozzle is rotated about a vertical axis to progressively remove the particulate matter from within the vessel. The slurrified material flows by gravity into the sump and into a collection tank from which it is pumped into a discharge line for subsequent handling and processing.

6 Claims, 5 Drawing Figures

APPARATUS FOR TRANSPORTING AND HANDLING BULK MATERIAL

REFERENCE TO COPENDING APPLICATION

Reference is made to copending application A-26790 Ser. No. 213,363 filed Dec. 29, 1971 now U.S. Pat. No. 3,749,314 and assigned to the present assignee, the Marcona Corporation.

BACKGROUND OF THE INVENTION

Bulk material such as mineral ores and the like have heretofore been transported from a mining area to processing plants or end use locations by means such as rail, ship, pipeline, or a combination thereof. It is well known to load a ship or railroad car hopper with material such as dressed ore by conveyors for movement to the unloading destination. Special loading and unloading equipment is required for either form of transportation, and the operations are time consuming and costly. More recently, slurry transportation methods and apparatus have been developed to provide more efficiency and capacity in the storage, handling and transporting of particulate matter of the foregoing nature. In these systems it is known to disperse the particulate matter with a liquid such as water to form a slurry which can then be relatively easily pumped, stored, transported and unloaded. Slurries of this type may be transported for long distances by being pumped through pipelines, but this requires a large capital investment and because of the fixed pipeline network there is no flexibility in choosing the delivery destination. Another slurry transport system is that in which the slurry is pumped into the hold of a ship, the solids are settled by gravity with supernatant water fractions removed by decantation in successive steps so that a settled mass of solids remains in the hold, the loaded ship is sailed to destination, and the mineral solids are reslurrified and pumped to a shore installation for subsequent processing. Method and apparatus for the transport of mineral solids by ships in this manner are set forth in U.S. Pat. No. 3,606,479 assigned to the assignee of the present invention.

It would be desirable to provide apparatus which achieves more efficiency in the loading, transporting and unloading of particulate matter and which would be adaptable for utilization in a railroad transport system. Railroad transport systems are preferred in many cases such as where a suitable water network is either not available or in an undesirable location, or where the transport distance is relatively short and does not justify the expense of transporting the cargo from the mining area to the ship and then from the ship to the end use location. It would be more economical to provide by means of a rail transport system only one loading operation at the mining area and only one unloading operation at the end use location such that the requirement for intermediate loading and unloading steps is reduced.

SUMMARY OF THE INVENTION AND OBJECTS

This invention relates to apparatus for the transportation and handling of bulk material such as particulate matter or mineral solids (e.g. iron ore solids) in liquid mixture or slurry form. In particular the invention relates to apparatus in which material of the foregoing nature is transported in a vessel on a railroad car after which it is slurrified and removed at an unloading zone along the railroad right of way.

It is a general object of the present invention to provide apparatus for the transportation and handling of bulk material of the character described in pumpable liquid mixture or slurry form. The apparatus of the invention has particular application to railroad transportation systems for the efficient and economical transport of such particulate matter in bulk form.

Another object is to provide apparatus of the foregoing character which will make it possible to directly load the bulk cargo on railroad cars at a production area, such as a mining site, for transportation as a train to destination where they are quickly unloaded in liquid mixture or slurry form for subsequent handling.

Another object is to provide apparatus of the above character in which bulk cargo in railroad tank cars is unloaded at destination by directing a high velocity stream of water into the settled mass of material within the vessel on the car to form a pumpable mixture or slurry which discharges from the vessel and is pumped away for further handling.

Another object is to provide apparatus of the above character in which the residue from water dispersible cargo transported in railroad tankcars having downwardly opening discharge outlets is cleaned from the tank by operation of an unloading and slurrifying unit mounted in a pit beneath the tankcar.

Another object is to provide apparatus of the above character in which a nozzle forming the liquid stream is mounted with a slurry receiving sump on a carriage adapted to move below and in a direction along the right of way. Selective movement of the carriage enables the nozzle and sump to be accurately positioned relative to the discharge outlet of the railroad car vessel so that the car need only be positionally spotted within a given range at the unloading zone.

Another object is to provide apparatus of the above character in which the sump is provided with means forming a fluid-tight seal around the discharge outlet of the vessel, and with contact of the sump against the vessel actuating means for directing the liquid stream through the nozzle. The apparatus provides for yieldably urging the sump into its sealing relationship with the vessel while progressively raising and rotating the nozzle such that the effect of the high velocity stream progressively slurrifies the entire body of the settled particulate matter.

Another object is to provide apparatus of the above character in which the vessel of a railroad tank car is characterized in having a flat, horizontally extending bottom wall with lateral side walls which extend upwardly and define included angles of less than 90° with respect to the bottom wall such that vertical support for the contained material is derived from the bottom wall.

The apparatus of the invention includes a railroad tank car carrying a fluid-tight vessel for containing, transporting and unloading a bulk material. The vessel is characterized in having a substantially flat bottom wall with lateral side walls which incline upwardly with respect to the bottom wall such that vertical support for the contained material is derived only from the bottom wall. At the loading site the material is introduced into the vessel by either dry loading, or in slurry form with a series of decanting operations removing successive supernatant fractions of water to leave a settled mass of particulate matter. A plurality of the cars are transported as a train to destination where an unloading zone is provided along the right of way. A pit is constructed beneath the railroad tracks with one or more unloading and slurrifying units serially positioned in the pit. Each unit includes a high pressure nozzle and associated slurry receiving sump mounted on a carriage independently of the cars and adapted to move below and in a direction along the right of way for spot positioning with respect to the discharge outlet of a car to be unloaded. Means are provided to elevate both the nozzle and sump with the sump moving into sealing contact with the portion of the vessel around the outlet, and means are provided to direct high pressure liquid to the nozzle responsive to contact between the sump and vessel. The nozzle is rotated while being elevated through the discharge outlet and into the vessel so that the high pressure stream impinges upon and forms a pumpable mixture or slurry with the settled mass such that the nozzle makes its own opening into the mass from below. The mixture or slurry flows by gravity through the discharge outlet and into the sump where it is directed away to a slurry collection tank within the pit. From this tank the slurry is pumped away for further processing and handling. After the vessel is completely unloaded in the foregoing manner the nozzle and sump are retracted to a lowered position and another loaded car in the train is positioned over the pit for a repetition of the foregoing unloading operation.

Additional objects and features of the invention will appear from the following description in which the preferred embodiment of the invention has been set forth in detail in conjunction with the accompanying drawings.

DETAILED DESCRIPTION OF THE PREFERRED EMBODIMENT

Figure 1:
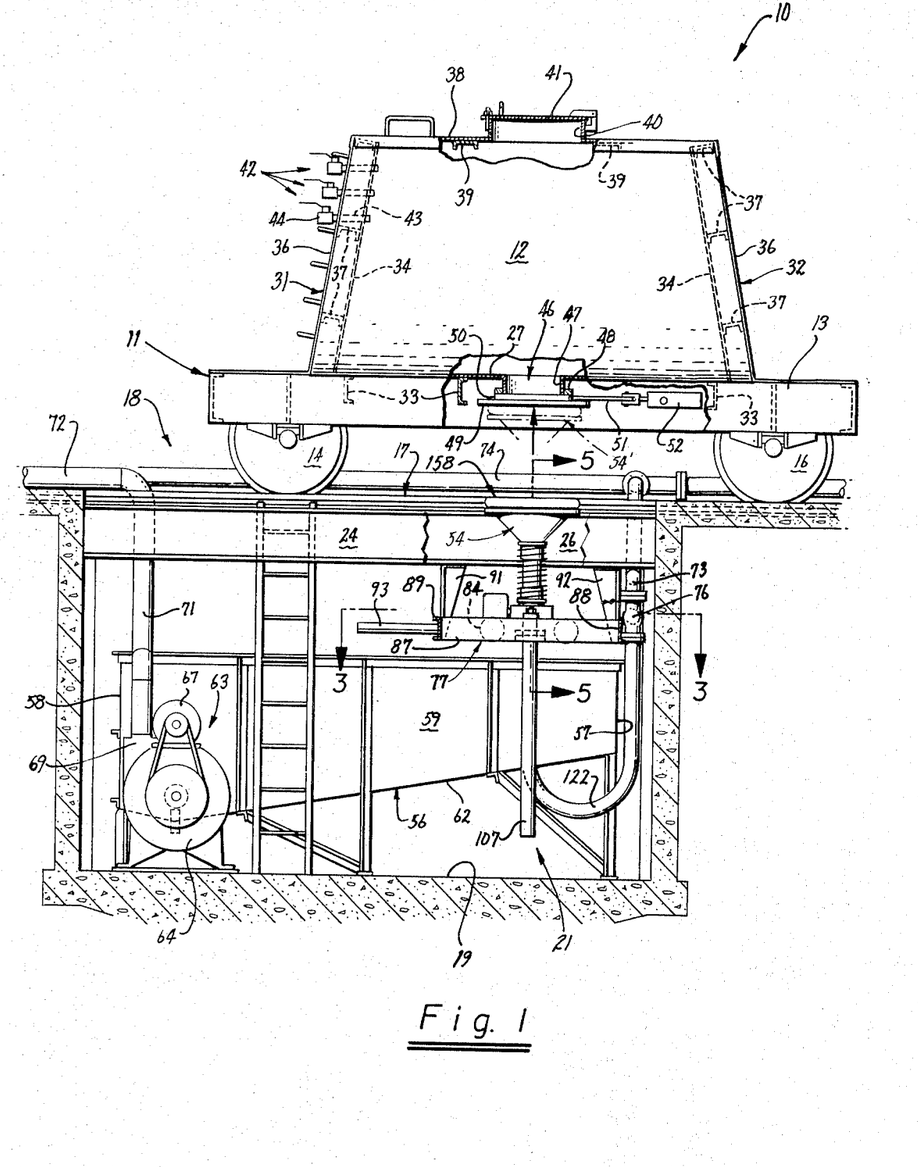
FIG. 1 is a side elevational view, partially in section, of apparatus within a pit at an unloading zone, and a railroad car positioned thereover, constructed in accordance with the present invention.

Referring to FIG. 1 there is shown apparatus constructed in accordance with the present invention for use in the transportation and handling of bulk materials such as particulate matter which is characterized by being dispersible into a pumpable liquid mixture or slurry. The apparatus is specially adapted for incorporation into a railway network such that the material may be transported utilizing railroad cars of the type described herein over existing rail lines. The invention will find particular application in the transportation of mineral solids such as iron ore filtrates and concentrates or other dressed mineral solids from a mining an ore dressing operation to an end use facility, processing station or storage area. The invention thus makes it feasible to directly load such cars at the mining operation, transport the cargo to destination through a unit train with optimum train routing benefits, and unload at destination by apparatus which requires a very short unloading time. Additionally the invention will find application for cleaning out the interior walls of railroad tankcars which have been utilized to carry other cargos such as potash, molasses, sugar beet syrup or crude oil and the like and which cargos are capable of being dispersed by high velocity liquid streams in the manner disclosed herein.

Apparatus 10 of the invention includes a railraod tankcar 11 comprising a fluid-tight vessel 12 mounted on a frame 13 which in turn is mounted through journals on front and rear axles and flanged wheel pairs 14, 16 which roll on a track 17 of conventional gauge. The section of the track illustrated preferably would be a spur track of a railway network located at the unloading site. Suitable car coupling apparatus, not shown, is provided at the ends of the car to couple a plurality of the cars in a train.

An unloading zone 18 is provided at a portion of the spur track in close proximity to the desired end use facility, e.g. a slurry pond or other stock pile area, or in proximity to a processing plant. An example of further handling of material which is delivered by the apparatus to a stock pile area would be for reloading into the hold of a ship through means of reslurrification procedures and apparatus as disclosed in said U.S. Pat. No. 3,606,479.

At the unloading zone, a pit 19 is formed beneath the right of way of the spur track by lining an excavation with suitable concrete flooring and walls. The pit is adapted to contain equipment which includes an unloading and slurrifying unit 21. Two laterally spaced rails 22, 23 forming the unloading section of the spur track are supported over the pit by respective I-beams 24, 26 extending longitudinally of the pit and embedded in the ends of the pit by suitable foundation structure.

The fluid-tight vessel 12 is characterized in being formed with a substantially flat, horizontally extending bottom wall 27 to facilitate the slurrifying action of the traversing water stream and promote drainage of the resulting slurry as explained hereafter. The vessel further includes lateral side walls 28, 29 and end walls 31, 32 which extend upwardly and define included angles of less than 90° with respect to the bottom wall which in turn is carried by structural channels 23 of the frame, so that vertical support for the material is soley derived from the bottom wall.

The side and end walls thus overhang the material and thereby reduce the possibility of the material bridging as it is unloaded. The end walls 31, 32 are formed by inner tank walls 34 spaced in supporting relationship with outer plates 36 through structural channels 37. Preferably the inner tank walls are of continuous welded steel plate construction to provide a fluid tight sealed container. A top plate 38 is mounted over the upper end of the lateral walls with suitable bracing provided by structural channels 39. A hatch 40 and hingably mounted cover 41 are provided on the top plate to afford access into the vessel for loading of the cargo, and for maintenance. On the end wall a plurality of drains 42, shown as three drains, are provided at vertically spaced positions in the top portion of the vessel for successive decanting operations to obtain a settled mass within the vessel, as described hereafter. Each of the drains comprises a pipe section 43 extending through both the inner tank wall and outer end plate together with a manually operated flow control valve 44.

A slurry discharge outlet 46 is provided in the vessel bottom wall and comprises a large diameter ring 47 mounted as by welding to depend below an opening formed in the bottom wall. A mounting ring 48 is secured as by welding to the lower end of ring 47, and an annular flat sealing plate 49 and valve gate housing 50 are mounted as by means of a plurality of circumferentially spaced bolts below the mounting ring. The discharge outlet is opened and closed by suitable means such as the illustrated flat valve gate 51 mounted for horizontal sliding movement across the lower opening of ring 47. The gate is reciprocated between its open and closed positions by suitable means such as an air actuator 52 supplied with air pressure from the pressurized air tanks of the train's air brake system and controlled through a suitable manually operated valve, not shown.

The unloading and slurrifying unit 21 within the pit includes mozzle means 53 to establish a high velocity stream of liquid, preferably water, and traverse the same through arcs of travel within the vessel to impinge upon and form a pumpable mixture or slurry with the contained material. Slurry or mixture receiving means 54 is associated with the nozzle means to receive the flow of slurry discharging by gravity through the vessel outlet and direct the same to a surge collection tank 56, FIG. 1. The collection tank is formed by end walls 57, 58 side walls 59, 61, and downwardly inclined bottom wall 62 defining a cubic volume sufficient to hold the quantity of slurrified material from one car for continuous removal from the tank by pump means 63. The pump means includes a conventional centrifugal acting pump 64 driven through reduction gearing 66 by an electric motor 67 and having an inlet 68 extending into the lowermost portion of the collection tank and an outlet 69 discharging into conduit 71 which in turn is connected into a discharge line 72 leading to the slurry pond or other stock pile area, or directly to an adjacent plant. Supply water for the nozzle means is distributed to the pit from a branch conduit leading from a supply manifold 74 under influence of a flow valve 76. The supply manifold is connected with a suitable source of pressurized water such as electric motor driven pumps of a capacity sufficient to deliver a large volume of water at high pressures, e.g. a water stream delivery rate for the nozzle of from about 190 – 210 gallons per minute and at a supply head of about 250 – 350 lbs per square inch.

While the apparatus of the invention is described in relation to a single pit at the unloading zone along a right of way, it is understood that the invention contemplates a plurality of pits, or a single elongate pit, containing a plurality of unloading and slurrifying units of the type described arranged in series along the right of way and positioned below the spur track. As an example, a series of four such units can be constructed along the right of way and spaced apart a sufficient distance so that a group of four cars coupled together may be positionally spotted on the track by a switching locomotive such that each car of the group is substantially in vertical registry with a respective unit. By this arrangement increased unloading capacity is obtained in that the four cars are unloaded simultaneously by the procedures described herein. After these cars are unloaded the train is moved to bring the next four cars into position over the four units.

The nozzle means 53 and mixture receiving means 54 are carried together on positioning means 77 for movement independently of the cars. The positioning means includes a carriage 78 adapted to move in a direction along the right of way within a predetermined range of travel to thereby accurately position the nozzle and mixture receiving means with respect to the vessel discharge outlet. Thus the difficult requirement for precise spotting of the railroad car over the pit is eliminated. Carriage 78 comprises a rectangular frame 79 journaled on a pair of axles 81, 82 carrying flanged wheels 83, 84 which are adapted to roll upon the lower walls of inwardly facing structural channels 86, 87. These channels are mounted longitudinally of the pit on end positioned cross beams 88, 89 which in turn are mounted to depend from I-beams 24, 26 by four corner positioned brackets 91, 92. The carriage is moved back and forth between the limits of its travel as defined by the cross beams by means of an actuator 93. The actuator preferably comprises an extensible hydraulic cylinder bolted at its rod end to cross beam 89 and having the distal end of its extendible rod 94 connected to the carriage frame through a pin coupling, 96. Suitable hydraulic controls, not shown, are provided to operate the actuator for extension and retraction thereof to traverse the carriage into a position of alignment with the car.

Figure 2:
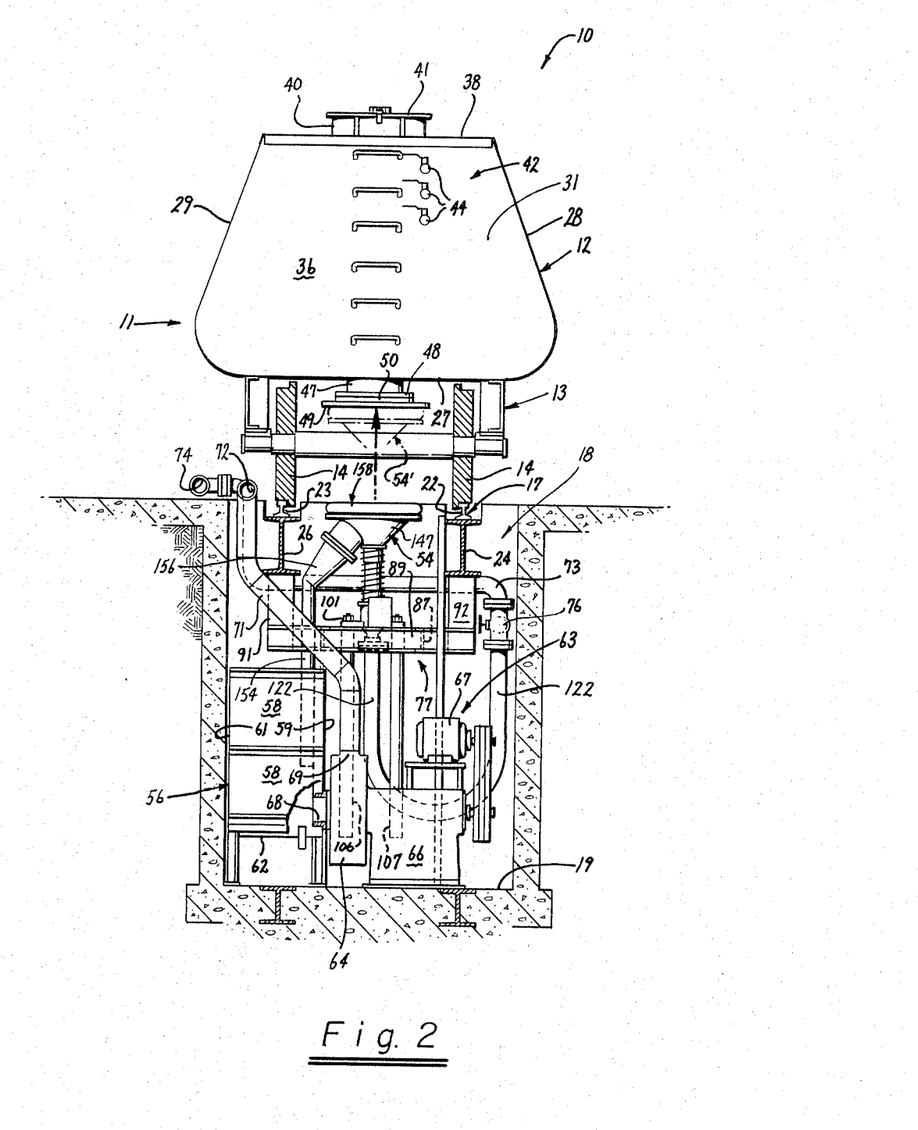
FIG. 2 is an end view partially in cross-sectional of the apparatus of FIG. 1.
Figure 3:
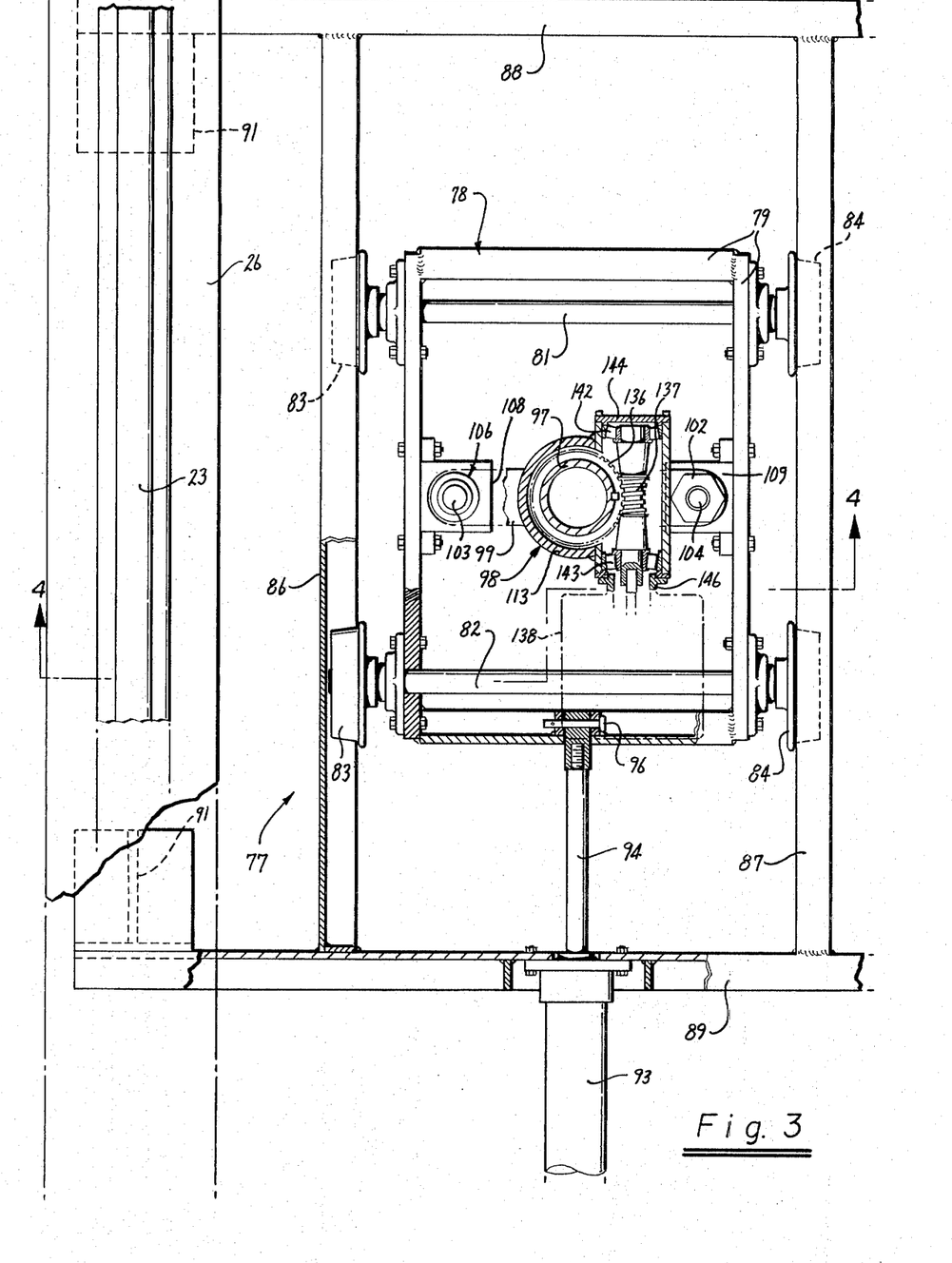
FIG. 3 is a cross-sectional view to an enlarged scale taken along the lines 3—3 of FIG. 1.
Figure 5:
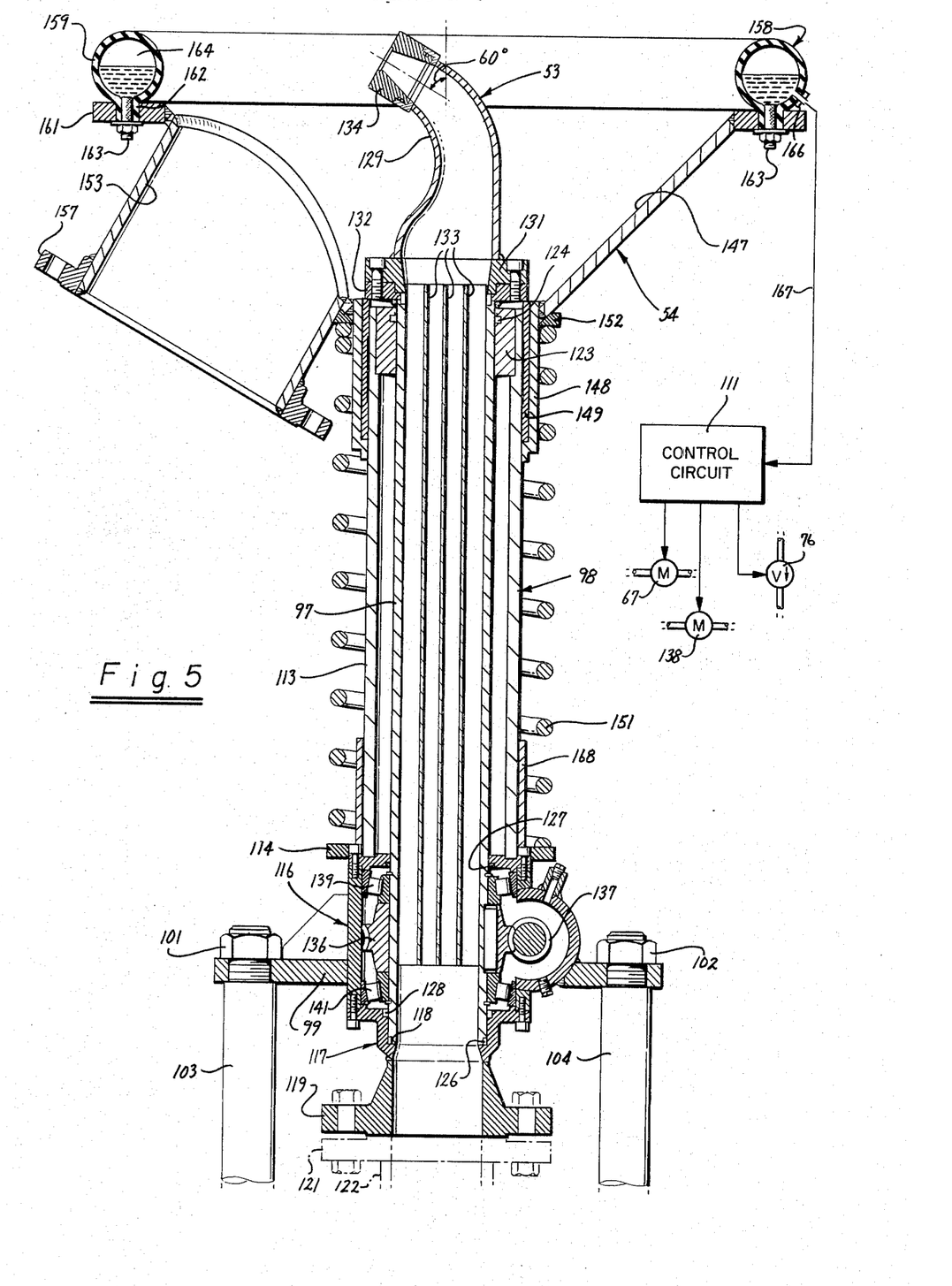
FIG. 5 is a cross-sectional view to an enlarged scale taken along the lines 5—5 of FIG. 1.

The means for establishing the liquid stream includes an upstanding hollow stem or conduit 97, best illustrated in FIGS. 3 and 5, mounted for rotary movement within an elongate annular housing assembly 98, which in turn is mounted for vertical sliding movement with respect to carriage 78 between the lowered position as shown in FIG. 5 and the raised position as shown in the brokenline position of FIGS. 1 and 2. Housing assembly 98 is mounted as by welding to a bracket 99 which in turn is mounted at either lateral end by jam nuts 101, 102 to the distal ends of actuating rods 103, 104 extending upwardly from a pair of actuators 106, 107, preferably comprising extendible hydraulic cylinders which form elevating means for the nozzle and mixture receiving means. The rod ends of the actuators are secured on the inside of the carriage frame by mounting brackets 108, 109 bolted to the frame sides. Suitable hydraulic controls, not shown, are provided to operate the actuators to conjointly extend and retract the two actuator rods and raise and lower the nozzle and mixture receiving means in a manner described in detail hereafter.

Housing assembly 98 comprises an upstanding cylindrical shell 113 secured at its lower end to a flanged adaptor ring 114 which in turn is bolted to a gear housing 116. This housing encloses the gear elements for imparting rotary motion to the nozzle. The gear housing in turn is secured as by welding to mounting bracket 99. A bottom cap 117 is bolted to the lower end of the gear housing and is formed with an intrusive annular shoulder 118 which forms a central opening and supports the lower end of nozzle conduit 113. An annular mounting flange 119 is welded to the lower end of the bottom cap. The mounting flange is secured by circumferential bolts to a connecting flange 121 on the discharge end of a high pressure flexible supply hose 122 which is connected at its inlet end with valve 73. The hose has sufficient flexibility and length to accommodate the range of vertical travel of the nozzle and mixture receiving means and in addition to accommodate the range of longitudinal travel of the carriage.

Nozzle conduit 97 extends upwardly from the gear housing and is rotatably supported at its upper end by means of a sleeve bearing 123 mounted within an enlarged inner diameter of housing shell 113 to provide rotary support within the shell. An annular seal 124 is provided between sleeve bearing 123 and the upper end of the nozzle conduit, and an annular seal 126 is provided between the lower end of the conduit and bottom cap 117. Annular seals 127 and 128 are provided on the adaptor ring and bottom cap respectively to form a seal between either end of the gear housing and the nozzle conduit.

A nozzle 129 is secured to the upper end of nozzle conduit 97 through a mounting flange 131 which is bolted to an adaptor ring 132 secured as by welding to the distal end of the nozzle conduit. The nozzle preferably is of the construction and operation as disclosed in said copending application Ser. No. 213,363 filed Dec. 29, 1971 now U.S. Pat. No. 3,749,314. Suffice it to say that nozzle 129 is specially characterized in converting a high pressure source of liquid into a high velocity liquid jet stream with high efficiency such that the jet stream is capable of impacting upon compacted solids with high forces so as to break up and disperse the solids into slurry form. A plurality of guide vanes, 133 shown as three, are mounted within nozzle conduit 97 and extend axially thereof to sub-divide and direct the supply stream into substream flows for discharge into the nozzle in the manner explained in said copending application. A nozzle cap 134 is mounted on the discharge end of the nozzle and is disposed to direct the jet stream at an angle with respect to the vertical axis of the nozzle conduit, and this angle in the illustrated embodiment is substantially 30°. This outwardly inclined angle for the jet stream is effective, when the nozzle is rotated, to progressively define an arc of travel which describes the surface of a core inside of the vessel for an efficient cutting and slurrifying action.

Nozzle 129 is slowly rotated within the vessel by means which includes a wheel gear 136 keyed to the lower end of nozzle conduit 97 and in meshing engagement with a worm gear 137 which in turn is driven by a motor 138, FIG. 3. The wheel gear is mounted between a pair of roller bearings 139, 141 providing rotary support between the lower end of the nozzle conduit and the gear housing. The opposite ends of the worm gear are rotatably supported by roller bearings 142, 143 mounted within the gear housing by means of end plate 144, and the bearing 143 is captured by means of an adaptor ring 146 which in turn is secured to the housing of worm gear motor 138. This motor is energized by means of control circuit 111, shown schematically in FIG. 5, substantially simultaneous with initiation of nozzle operation responsive to contact of the slurry receiving means with the vessel, as explained hereafter.

Figure 4:
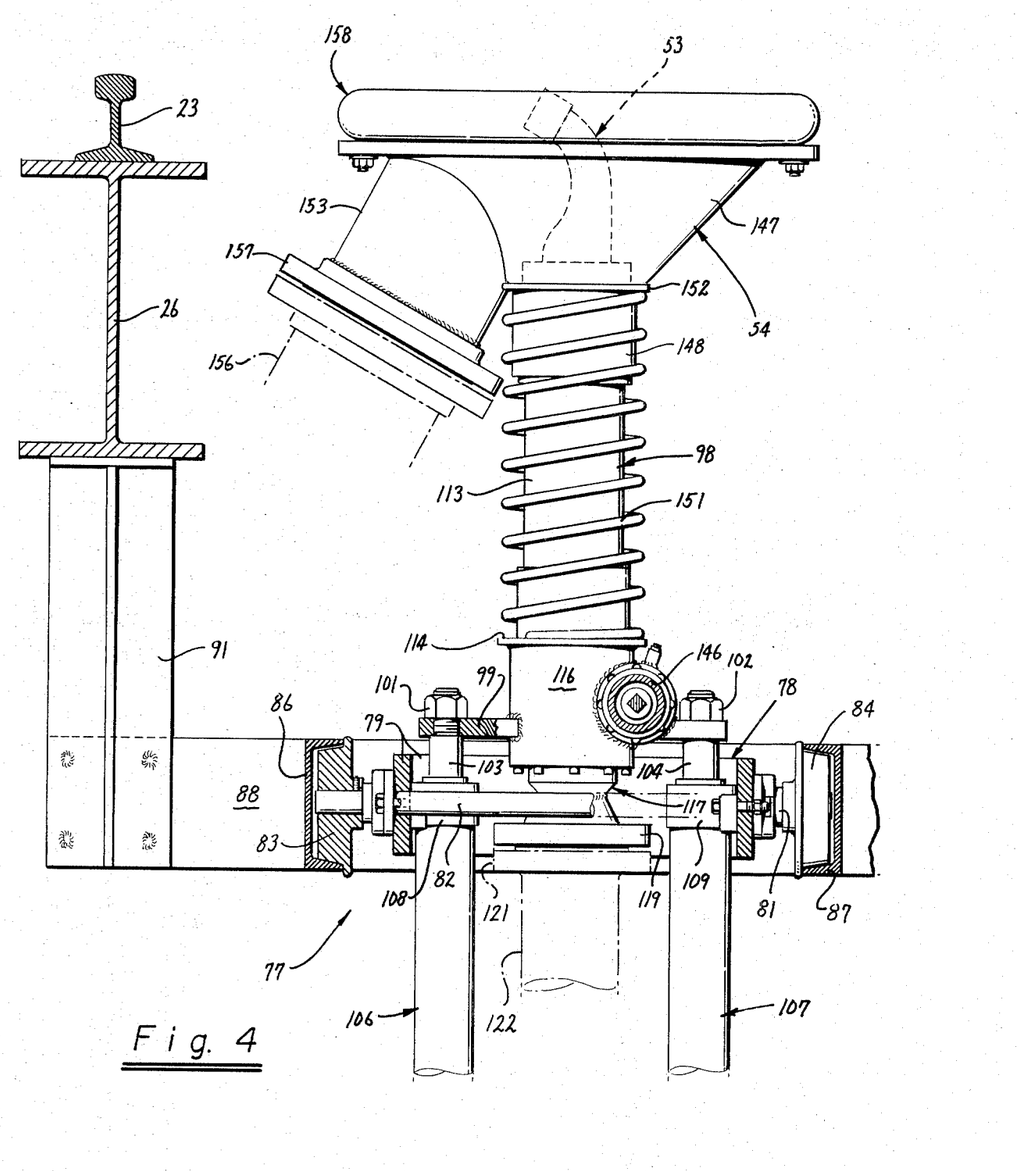
FIG. 4 is cross-sectional view in elevation taken along the lines 4—4 of FIG. 3.

As best shown in FIGS. 4 and 5 mixture receiving means 54 includes a sump 147 of frusto-conical shell configuration with its side walls opening upwardly and mounted around nozzle 53. The lower end of the sump is secured as by welding to the upper end of a collar 148 mounted by means of a sleeve bearing 149 for axial sliding movement around the upper end of cylindrical shell 113. The sump is yieldably urged upwardly with respect to the shell by means of a coil spring 151 mounted concentric about the housing assembly and seated at its lower end against the flange of adaptor ring 114 and at its upper end against an annular register 152 welded to the lower end of the sump. The coil spring functions to provide a yieldably force urging the sump into sealing contact with the vessel as actuating rods 103, 104 are extending upwardly and nozzle 53 proceeds upwardly into the vessel to the end of its stroke. A cylindrical discharge spout 153 is welded around an opening formed in a side of sump and inclines outwardly therefrom to direct the downward flow of slurry from the sump into a rigid discharge pipe 154 having an upper flanged bight portion 156 connected by a circle of bolts to a connector flange 157 welded to the lower end of the discharge spout. As best illustrated in FIG. 2 the lower end of the discharge pipe 154 depends vertically downwardly into the collection tank. The discharge pipe is thus adapted to be elevated with the sump between the latter's extended and retracted positions while the outlet of the pipe remains in discharge relationship with the collection tank.

Combination sump seal and fluid stream actuating means 158 is provided at the enlarged upper end of sump 147 and includes an annular collar 159 of an elastomeric material such as neoprene mounted above a support ring 161 welded about the peripheral edge of the sump. The annular collar is formed with a plurality of downwardly extending projections 162 which seat within peripheral openings formed in the support ring. Suitable fasteners such as stud bolts 163 are provided with knurled ends which, when a nut is turned into the threaded end of the stud, draws the projections 162 into tight sealing relationship within the ring openings. The collar defines an annular chamber 164 within which is contained a volume of sensing liquid, such as water. Contact sensitive means is provided and includes a suitable pressure sensing switch 166 mounted to project through the collar for sensing the pressure of the contained liquid and adapted to direct a control signal through line 167 to control circuit 111. Movement of the sump to its extended position as it is carried upward by actuating rods 103, 104 moves the annular collar into contact with flat sealing plate 49 around the vessel discharge outlet of a car. This establishes a liquid-tight seal around the periphery of the sump and prevents slurry overflow and spillage, which otherwise would constitue a loss of the product and could be hazardous in flooding the area and interfering with operation of the unloading equipment. The thrust force which is maintained between the sump and vessel seal plate from the coil spring results in an elastic distortion or flattening of the collar which in turn pressurizes the contained volume of liquid and air. This increase in pressure is sensed by switch 166 which directs a signal to control circuit 111 to open nozzle supply valve 76, energize nozzle rotating motor 136, and energize slurry discharge motor 67 for emptying surge tank 56.

The sealing contact between the sump and seal plate is continually maintained as nozzle 53 extends further upwardly into the vessel. An annular spacer 168 is mounted about housing assembly 98 adjacent adaptor ring 114 to provide a fixed stop against which the lower end of collar 148 engages to limit the extend of upward travel of the housing assembly, and thereby to limit the working stroke of the nozzle. Following unloading of the material from the vessel the control circuit is actuated to close supply valve 76, terminate operation of nozzle rotating motor 138, and retract actuators 106, 107 to lower the nozzle and slurry receiving means to their respective lowered and retracted positions spaced below the railroad car. The unloaded car is now moved from the unloading zone and replaced by a loaded car which is indexed in position over the zone.

The use and operation of the invention will now be described in relation to the transportation of a mineral ore comprising for example, dressed iron ore concentrate. The loading site would be a storage area adjacent a mining operation where equipment is provided to combine the mineral ore with water to form a slurry which is temporarily stored in a slurry pond. A train of empty railway cars constructed according to the invention are each loaded by successive slurry filling and decanting operations. A charge of slurry is pumped through the hatch into the empty vessel of each car and the particular matter is permitted to settle into a lower fraction of high solids content and a supernatant water fraction after a predetermined time period. The water fraction is then decanted by opening the lower drain valve leaving only the settled, high solids fraction. A second charge of slurry is pumped into the remaining volume of the vessel and the particulate matter is again permitted to settle into a lower high solids content fraction and a supernatant water fraction. The water fraction is decanted by opening the second drain valve. A third slurry charge is then pumped into the remaining volume of the vessel, the particulate matter allowed to settle, and the resulting water fraction removed through the uppermost drain valve. In certain installations dressed mineral solids may be dry-loaded by dumping the same directly into the vessel through the hatch. During transportation of the cargo over the railroad network the car's vibrations and motion together with the hydrostatic head created by gravity will tend to settle the material into a dense, caked mass which is extremely solid and difficult to reconstitute into a slurry.

At the destination, such as adjacent a dock loading facility adapted to load a cargo ship with particulate matter in slurry form, the train of cars is shunted onto a spur tract. Four unloading zones each including apparatus constructed in accordance with the invention are serially located along the spur track with each adjacent pair of these zones spaced apart a distance equal to one car length. The first group of four loaded cars in the train are moved by a switching locomotive into positions such that each of the cars is substantially directly over an unloading and slurrifying unit in a respective pit. The operator stationed at the unloading zone visually observes the position of the nozzle 53 and sump 54 of each unit with respect to the overlying car. As required, the operator energizes the control for carriage actuator 93 to either extend or retract the same for moving carriage 78 along its track and precisely position the nozzle and sump with respect to discharge outlet of the vessel. The operator opens the valve for the car's air cylinder 52 to retract gate 51 and expose the vessel's discharge outlet 46. Following this the operator energizes the control circuit for the pair of actuators 106, 107 which extend and elevate the nozzle and sump toward their respective raised and elevated positions. Contact is first made with the vessel's flat seal plate 49 by annular collar 159 which elastically flattens under the thrust force maintained by coil spring 151. An increase in pressure within collar actuates pressure sensing switch 166 to energize the control circuit for opening nozzle supply valve 76 energizing worm wheel motor 138 for rotating the nozzle about a vertical axis, and energizing slurry pump 67 for emptying surge tank 56.

After the sump is sealed with respect to the vessel seal plate and the nozzle operation is initiated in the foregoing manner, the two actuators 106, 107 continue to extend and elevate the rotating nozzle. The high velocity water jet from the nozzle impinges upon and pulps the material which bridges across the discharge outlet into a pumpable slurry or mixture by causing the compacted solids to disperse and break up and become suspended in the water. As the slurry flows by gravity through the discharge outlet and into the sump the rotating nozzle continues to elevate and thereby make its own entry hole from beneath the compacted mass. The linear velocity of nozzle elevation and the angular velocity of nozzle rotation are maintained by the control system so that the ratio of solids to liquid in the slurry is controlled at an optimum range, preferably between about 75 percent and 80 percent. Flow velocity of the water stream may also be controlled as by varying supply pressure to maintain the desired solids-to-fluid ratio. The formation of the slurry or mixture is a combination of direct impingement and break-up of compacted material by the jet stream together with the formation of an undercut in the material followed by gravital collapse of the overburden downwardly into the area of influence of the rotating stream. The pulping and slurrifying action is continued to the uppermost extent of the nozzle stroke as limited by contact of sump collar 148 with spacer 168 mounted above the gear housing. After the cargo is completely unloaded the operator energizes the control circuit to retract the pair of actuators 106, 107 and move the nozzle and sump downwardly to their respective lowered and retracted positions. Disengagement of the sump collar from the vessel's seal plate generates a signal in the control circuit to close the nozzle supply valve and de-energize the nozzle rotating motor.

The slurry or mixture which is formed within the vessel flows by gravity across bottom wall 29, through a slurry discharge outlet 46, into sump 147 and out through sump discharge spout 153 which directs it into discharge pipe 154. From the outlet of the discharge pipe the slurry flows into collection tank 56 which can accumulate the entire slurrified load from a single car. Slurry pump 64 pumps the slurry from the collection tank into discharge line 72 for delivery to the slurry pond for subsequent handling, such as onloading as a slurry to a ship.

The use and operation of the apparatus of the invention for cleaning out the residue from the interior of a vessel on a car which has been used for transporting other water dispersible materials such as potash, molasses, sugar beet syrup or crude oil is as follows. A train of the unloaded cars are switched onto the spur track having four unloading zones as described in the foregoing example. At each unloading zone the unloading and slurrifying units are operated as described to move the nozzle and sump of each unit into precise vertical alignment underneath a respective discharge outlet on the vessel of an overlying car. With the discharge gate of the vessel in open position, the nozzle and sump are elevated. Contact of the sump collar with the vessel seal plate both energizes the control circuit to initiate nozzle and surge tank pumping operations, and forms a fluid-tight seal about the sump. Continued elevation of the nozzle carries the nozzle through the vessel's discharge outlet so that the high velocity water stream impinges upon, breaks up and disperses the residual material lining the interior walls of the vessel. The dispersed material is carried as a pumpable slurry or mixture in the water out through the discharge outlet and into the sump and discharge pipe for deposit in the surge tank from which it is pumped into the discharge line for subsequent handling.

While the foregoing embodiments are at present considered to be preferred it will be understood that numerous variations and modifications may be made therein by those skilled in the art and it is intended to cover in the appended claims all such variations and modifications as fall within the true spirit and scope of the invention.

In the preferred embodiments of the present invention the nozzle, sump, and associated apparatus are carried together as a self-supporting unit mounted for movement in the pit. However, various portions of this unit could be independently supported or carried to operative alignment from other positions without departing from the spirit and scope of this invention. By way of example, the present disclosure is constructed and arranged so that the nozzle is carried as an integral part within the sump. While this arrangement has certain advantages, it may be desirable to make the nozzle and dispersing liquid supply in an overhead configuration separate from the sump assembly. In the operation of such a modified system, the sump would be brought into position under the car as has been explained in connection with the discussion of the arrangement illustrated as a preferred embodiment herein.

An overhead support structure carrying the nozzle would be positioned in the car and carrying the jet nozzle in an operative position above the opening and sump approximately the same as that shown herein before in connection with the illustrated embodiment. Unloading would proceed after placement of the sump and hook up of the nozzle high pressure liquid supply as previously described. Accordingly the present disclosure and claims are intended to comprehend not only the specific embodiments shown, but also those variations and modifications which would occur to a person skilled in this art, and in particular those modifications which could be made solely by independently mounting the various portions of the apparatus.

We claim:

1. In a system for unloading a material from a vessel mounted on a car adapted for movement in a train of said cars along a right of way, the material being dispersible with a liquid to form a pumpable mixture, each vessel being characterized in having means forming a discharge outlet in a lower portion of said vessel, the combination of nozzle means for directing a stream of liquid into said material to form a mixture therewith, said nozzle means being located independent of said car at an unloading zone on said right of way, positioning means mounting said nozzle means for movement at said unloading zone between a lowered position spaced below a selected one of said vehicles at said unloading zone and a raised position projecting through said discharge outlet of the vessel whereby said stream of liquid impinges upon said material, mixture receiving means including a sump mounted at said unloading zone for movement between a retracted position spaced below the selected vehicle and an extended position to receive the mixture discharging through said discharge outlet and to direct the mixture to a zone remote therefrom, means directing liquid under pressure to said nozzle means, control means to actuate said last mentioned means responsive to movement of the mixture receiving means to said extended position, said control means including contact sensitive means carried by said sump to actuate said means directing pressurized liquid to the nozzle means responsive to contact being established between said sump and said vessel, said contact sensitive means including a hollow annulus of an elastomeric material mounted about the upper end of said sump to contact a portion of said vessel surrounding said discharge outlet and adapted to effect a liquid-tight seal when in contact with the vessel, and a fluid contained within said annulus whereby pressurization of said contained fluid responsive to elastic flattening of said annulus upon contact thereof with the vessel establishes a control signal to actuate said means directing pressurized liquid to the nozzle means.

2. In a system for unloading a material from a vessel mounted on a car adapted for movement in a train of said cars along a right of way, the material being dispersible with a liquid to form a pumpable mixture, each vessel being characterized in having means forming a discharge outlet in a lower portion of said vessel, the combination of nozzle means for directing a stream of liquid into said material to form a mixture therewith, said nozzle means being located independent of said car at an unloading zone on said right of way, positioning means mounting said nozzle means for movement at said unloading zone between a lowered position spaced below a selected one of said vehicles at said unloading zone and a raised position projecting through said discharge outlet of the vessel whereby said stream of liquid impinges upon said material, mixture receiving means mounted at said unloading zone for movement between a retracted position spaced below the selected vehicle and an extended position to receive the mixture discharging through said discharge outlet and to direct the mixture to a zone remote therefrom, said mixture receiving means including a sump together with means to mount said sump on said positioning means for yieldable sliding movement with respect to said nozzle means whereby said nozzle means is adapted to progress into said vessel independently of said sump following contact of the latter with the vessel, an upstanding liquid supply conduit carried by said nozzle positioning means, at least one nozzle mounted up on the upper end of said conduit, said sump being mounted about and in axial sliding relationship with respect to said conduit, together with means to yieldable urge said sump upwardly with respect to said conduit, and means directing liquid under pressure to said nozzle means.

3. Apparatus as in claim 2 in which said positioning means includes means to move said nozzle means in a direction along said right of way to a position with said nozzle means in substantial vertical alignment with said discharge outlet to accommodate a range of car positions along said right of way at said unloading zone.

4. Apparatus as in claim 3 in which said means to move the nozzle means includes a carriage mounted for back and forth movement at said unloading zone in a direction along said right of way, and said positioning means includes elevating means mounting said nozzle means on said carriage for vertical movement between said raised and lowered positions.

5. Apparatus as in claim 2 in which said mixture receiving means includes a sump, together with collection tank means at said unloading zone, conduit means to direct a flow of said mixture from said sump to said collection tank means, and pump means to pump the mixture from the collection tank means to a zone remote therefrom.

6. Apparatus for use in transporting and handling material at an unloading zone on a railroad right-of-way, the material being dispersable with a liquid to form a pumpable mixture, the combination of a vessel for receiving said material, the vessel including a substantially flat, horizontally extending bottom wall, and lateral side walls extending upwardly and defining included angles of less than 90° with respect to said bottom wall, means forming a discharge outlet in said bottom wall including means to close said outlet for retaining the material within the vessel and to open said outlet for receiving the movement of nozzle means therethrough and to direct the mixture therethrough, a railroad car supporting the vessel for movement along the right-of-way, liquid drain means in at least one sidewall of said vessel to drain supernatant water fractions therefrom for decanting a charge of liquid and material mixture which is loaded within said vessel for transport, an annular sealing plate mounted about said discharge outlet, nozzle means for directing a stream of liquid into said material to form said mixture, said nozzle means being located independent of said vessel at said unloading zone on said right-of-way, positioning means mounting said nozzle means for movement at said unloading zone between a lowered position spaced below said car at said unloading zone and a raised position projecting through said discharge outlet whereby said stream of liquid impinges upon said material, mixture receiving means mounted at said unloading zone for movement between a retracted position spaced below said car and an extended position to receive the mixture discharging through said discharge outlet and to direct the mixture to a zone remote therefrom, said mixture receiving means including a sump together with means to mount said sump on said positioning means for yieldable sliding movement with respect to said nozzle means whereby said nozzle means is adapted to progress into said vessel independently of said sump following contact of the latter with the vessel, an upstanding liquid supply conduit carried by said nozzle positioning means, said nozzle means including at least one nozzle mounted on the upper end of said conduit, said sump being mounted about and in axial sliding relationship with respect to said conduit, together with means to yieldably urge said sump upwardly with respect to said conduit, and means directing liquid under pressure to said nozzle means.

* * * * *